US011917388B2

(12) United States Patent
Tabata

(10) Patent No.: US 11,917,388 B2
(45) Date of Patent: Feb. 27, 2024

(54) SPEAKER DEVICE

(71) Applicant: Foster Electric Company, Limited, Tokyo (JP)

(72) Inventor: Takayuki Tabata, Tokyo (JP)

(73) Assignee: Foster Electric Company, Limited, Tokyo (JP)

( * ) Notice: Subject to any disclaimer, the term of this patent is extended or adjusted under 35 U.S.C. 154(b) by 199 days.

(21) Appl. No.: 17/600,268

(22) PCT Filed: Feb. 19, 2020

(86) PCT No.: PCT/JP2020/006438
§ 371 (c)(1),
(2) Date: Sep. 30, 2021

(87) PCT Pub. No.: WO2020/202858
PCT Pub. Date: Oct. 8, 2020

(65) Prior Publication Data

US 2022/0182765 A1 Jun. 9, 2022

(30) Foreign Application Priority Data

Apr. 2, 2019 (JP) ................................ 2019-070796

(51) Int. Cl.
*H04R 9/06* (2006.01)
*H04R 1/28* (2006.01)
(Continued)

(52) U.S. Cl.
CPC ............ *H04R 9/06* (2013.01); *H04R 1/2811* (2013.01); *H04R 9/025* (2013.01); *H04R 9/043* (2013.01); *H04R 2499/13* (2013.01)

(58) Field of Classification Search
CPC ........ H04R 9/06; H04R 1/2811; H04R 9/025; H04R 9/043; H04R 2499/13
See application file for complete search history.

(56) References Cited

U.S. PATENT DOCUMENTS 6,389,146 B1 * 5/2002 Croft, III ............ H04R 1/2842 381/345
7,724,915 B2 * 5/2010 Matsumura ............ H04R 9/025 381/412
(Continued)

FOREIGN PATENT DOCUMENTS

CN 102196326 A 9/2011
CN 102934463 A 2/2013
(Continued)

OTHER PUBLICATIONS

Office Action for Japanese Patent Application No. 2019-070796 issued by the Japanese Patent Office; dated Sep. 28, 2021; entire document.

(Continued)

*Primary Examiner* — Brian Ensey
(74) *Attorney, Agent, or Firm* — Allen, Dyer, Doppelt & Gilchrist, P.A.

(57) ABSTRACT

A speaker device includes a speaker unit including a magnetic circuit and a diaphragm, connected to the magnetic circuit and being capable of generating sound waves by electrically driving the magnetic circuit to vibrate the diaphragm; and a Helmholtz resonator connected to the speaker unit. The diaphragm includes a first surface oriented to a sealed space, and a second surface that is back surface of the first surface and is oriented to the Helmholtz resonator.

5 Claims, 10 Drawing Sheets

(51) Int. Cl.

| | |
|---|---|
| ***H04R 9/02*** | (2006.01) |
| ***H04R 9/04*** | (2006.01) |

(56) References Cited

U.S. PATENT DOCUMENTS

| | | | |
|---|---|---|---|
| 2011/0206228 | A1 | 8/2011 | Shiozawa et al. |
| 2012/0219171 | A1 | 8/2012 | Zeljko |
| 2013/0188806 | A1 | 7/2013 | Tada |
| 2018/0063610 | A1 | 3/2018 | Tanabe et al. |
| 2019/0082252 | A1 | 3/2019 | Grazian et al. |

FOREIGN PATENT DOCUMENTS

| | | | |
|---|---|---|---|
| CN | 204634015 | U | 9/2015 |
| CN | 107770703 | A | 3/2018 |
| CN | 207968904 | U | 10/2018 |
| JP | S6137047 | U1 | 3/1986 |
| JP | 2003523673 | A | 8/2003 |
| JP | 2013150126 | A | 8/2013 |
| JP | 2013176030 | A | 9/2013 |
| WO | WO2009130780 | A1 | 10/2009 |
| WO | WO2018050718 | A1 | 3/2018 |

OTHER PUBLICATIONS

International Search Report and Written Opinion for PCT/JP2020/006438 issued by the Japanese Patent Office; dated Apr. 28, 2020.

China State Intellectual Property Office; Office Action received for Chinese Patent Application Serial No. 202080035356.2; dated Nov. 20, 2023; entire document.

* cited by examiner

SPEAKER DEVICE

CROSS-REFERENCE TO RELATED APPLICATIONS

This application is the § 371 National Stage Entry of International Application No. PCT/JP2020/006438, filed on Feb. 19, 2020, which claims the benefit of Japanese Patent Application No. 2019-070796, filed on Apr. 2, 2019, the contents of which applications are herein incorporated by reference in their entirety.

FIELD OF THE INVENTION

The present disclosure relates to a speaker device to be mainly mounted on a vehicle

BACKGROUND OF THE INVENTION

In recent years, in the environment of music reproduction in the vehicle cabin of an automobile, the spread of digital contents that make an occupant easily enjoy high-quality sound increasingly gives opportunities to reproduce even deep bass.

The location of an on-vehicle woofer system in an automobile is limited mainly to the inside of a door, a partition between a vehicle cabin and a luggage compartment (trunk), such as the back surface of a rear seat, or under a seat, for example. This is because there is a need to emit sound waves toward the inside of the vehicle cabin and to secure the space for placing the speaker device.

In particular, a speaker device such as a woofer for reproducing bass and a subwoofer for reproducing deep bass is generally in a relatively large size. An idea is thus needed to mount such a large device in a limited space for placement.

Known as a technique of reducing the size of an on-vehicle speaker device is communicating the space behind the diaphragm of the speaker with the outside of the vehicle in order to form an infinite baffle while reducing the volumetric capacity of the space.

For example, Patent Document 1 discloses an exhaust port that causes a back pressure space of a diaphragm of a speaker device, which is opposite to a sound output space, to communicate with the outside of a vehicle. The exhaust port penetrates a wall defining a vehicle front space. With this configuration, when the diaphragm of the speaker device in the vehicle front space vibrates, the air flows in and out between the back pressure space of the diaphragm and the outside of the vehicle through the exhaust port penetrating the wall partitioning the space into the vehicle front space and the outside of the vehicle. The diaphragm thus vibrates without being hindered by the air of the back pressure space. In addition, the vehicle front space including the speaker device and the outside of the vehicle are adjacent to each other with the wall interposed therebetween so that the exhaust port penetrating the wall has a relatively small size.

CITATION LIST

Patent Document

Patent Document 1: Japanese Unexamined Patent Application Publication No. 2013-176030

However, in the technique according to Patent Document 1, the exhaust port communicates with the outside of the vehicle, which may cause unnecessary emission of sound to the outside of the vehicle. In addition, rainwater, sand, dust and insects may enter the speaker through the exhaust port.

SUMMARY OF THE INVENTION

The present disclosure was made to solve such problems. It is an objective of the present disclosure to provide a speaker device that achieves miniaturization and bass reproduction and that reduces unnecessary sound leakage to the outside of a vehicle.

In order to achieve the objective, a speaker device according to the present disclosure includes: a speaker unit including a magnetic circuit and a diaphragm that is connected to the magnetic circuit and being capable of generating sound waves by electrically driving the magnetic circuit to vibrate the diaphragm; and a Helmholtz resonator connected to the speaker unit. The diaphragm includes a first surface oriented to a sealed space and a second surface that is a back surface of the first surface of the first surface and is oriented to the Helmholtz resonator.

In the speaker device described above, the Helmholtz resonator may include a chamber oriented to the second surface and a duct connected to the chamber and having an opening in addition to a joint with the chamber.

In the speaker device described above, the magnetic circuit may be connected to the second surface of the diaphragm.

In the speaker device described above, the magnetic circuitry may be connected to the first surface of the diaphragm.

In the speaker device described above, the Helmholtz resonator may have a resonance frequency set higher than an upper limot of an operation band frequency of the speaker unit.

In the speaker device described above, the sealed space may be provided by a sealed container.

In the speaker device above, the sealed container may include a structure constituting an automobile.

The speaker device according to the present disclosure using the means described above achieves miniaturization and bass reproduction and reduces unnecessary sound leakage to the outside of a vehicle.

DETAILED DESCRIPTION OF PREFERRED EMBODIMENTS

Embodiments of the present disclosure will now be described with reference to the drawings.

First Embodiment

In a first embodiment, a speaker device 1 will be descried which includes a Helmholtz resonator and a sealed container with a diaphragm 21 interposed therebetween, when mounted on an automobile.

Figure 1:
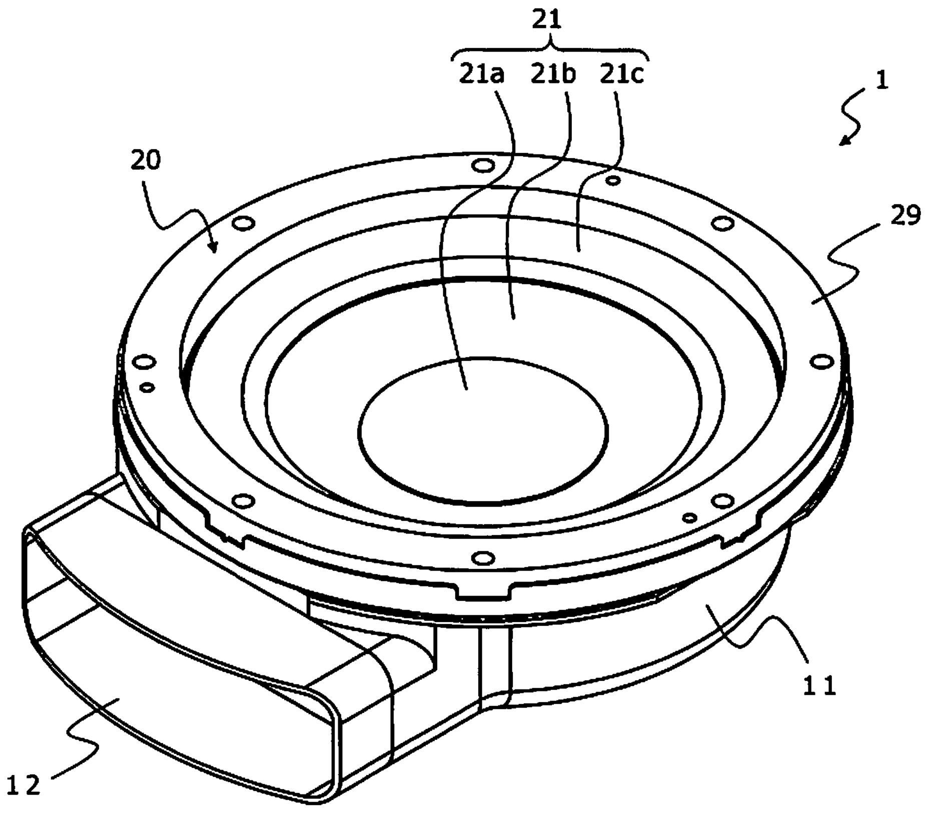
FIG. 1 is a perspective view of a speaker device according to a first embodiment of the present disclosure.
Figure 2:
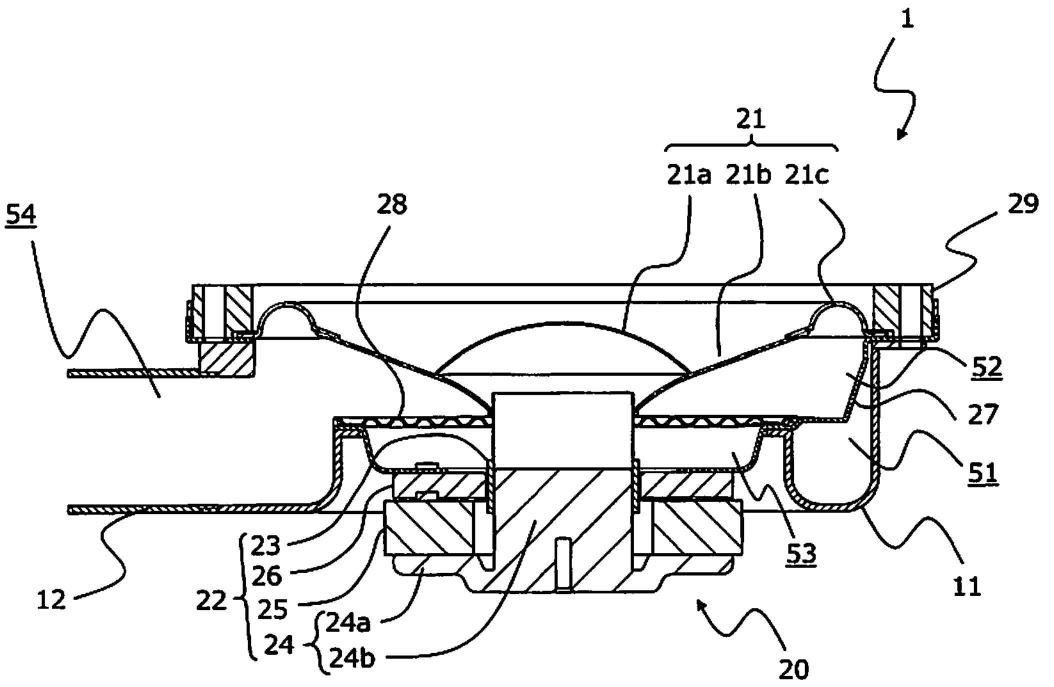
FIG. 2 is a cross-sectional view of the speaker device according to the first embodiment of the present disclosure.
Figure 3:
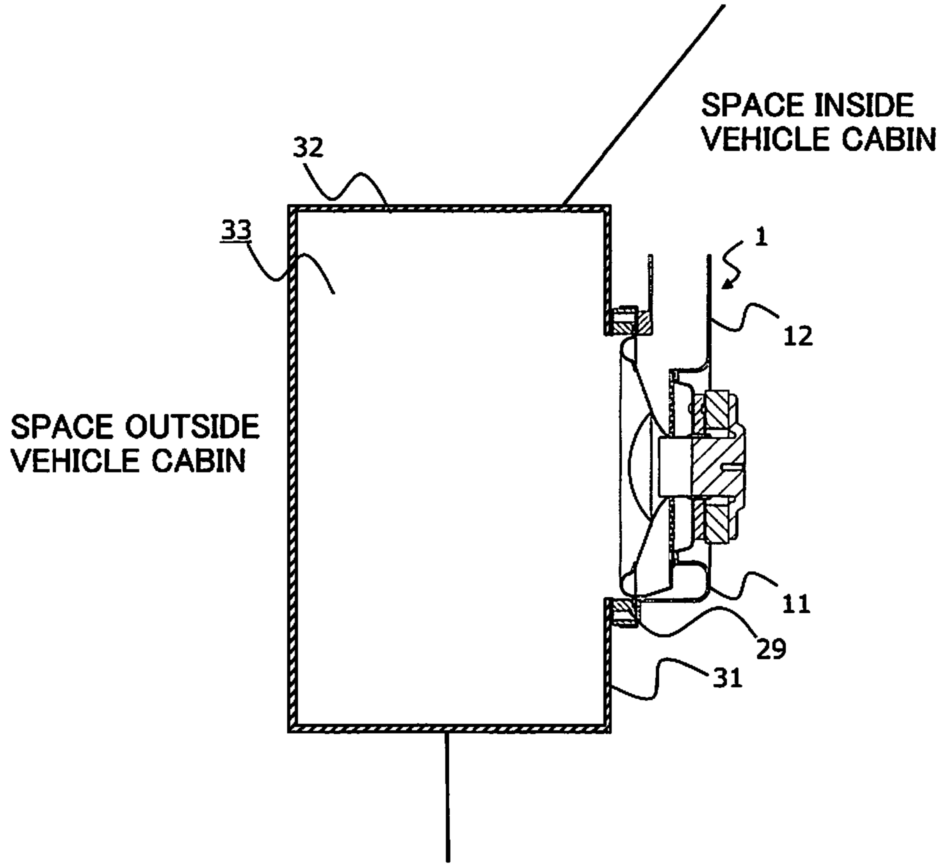
FIG. 3 is a cross-sectional view where the speaker device according to the first embodiment of the present disclosure is mounted on a vehicle.

FIG. 1 is a perspective view of the speaker device 1 according to the first embodiment of the present disclosure. FIG. 2 is a cross-sectional view of the speaker device 1 taken along the center of a duct 12 and a cap 21*a* in FIG. 1. FIG. 3 is a cross-sectional view where the speaker device 1 is mounted on an automobile. A configuration of the speaker device 1 will now be described with reference to these figures.

As shown in FIGS. 1 and 2, the speaker device 1 includes a case 11 connected to a frame 29 and a frame 27 of a speaker unit 20. The case (or chamber) 11 includes the duct 12 partially having an opening. The case 11 is joined to the speaker unit 20 to form spaces (e.g., spaces 51, 52, and 53 in FIG. 2). The spaces communicate with the outside via space 54 defined by the duct 12.

The speaker unit 20 includes the diaphragm 21 and a magnetic circuit 22. Hereinafter, the side of the speaker unit 20 with the diaphragm 21 will be referred to as the “front”, and the side with the magnetic circuit 22 as the “back.” The diaphragm 21 includes the cap 21*a* in the shape of a dome around the center, a cone 21*b* extending radially outward from the center, and an edge 21*c* around the circumference of the cone 21*b*. The center proximal end of the cone 21*b* is connected to a voice coil bobbin 23 wound with a coil of the magnetic circuit 22 to transmit the vibration of the voice coil bobbin 23. That is, the axial direction of the speaker unit 20 coincides with the amplitude direction of the diaphragm 21.

The magnetic circuit 22 includes the yoke 24 having a back surface serving as a disk-shaped flange 24*a*, and a column 24*b* projecting from the center of the flange 24*a*. A voice coil bobbin 23 is disposed on the outer circumference of the column 24*b* of the yoke 24 so as to be vibratable along its axis, and an annular magnet 25 is provided on the outer circumference of the voice coil bobbin 23. The magnet 25 is sandwiched between the flange 24*a* of the yoke 24 and an annular plate 26.

The magnetic circuit 22 mainly includes the voice coil bobbin 23, the yoke 24, the magnet 25, and the plate 26, and is what is called an “external magnetic circuit” having the magnet 25 on the outer side of the magnetic circuit The region from the plate 26 to the circumferential edge 21*c* of the diaphragm 21 is covered with a frame 27. A damper 28 is interposed between the inner surface of the frame 27 and the outer circumference of the voice coil bobbin 23. The damper 28 is vibratably supports the voice coil bobbin 23.

Although not shown, a voice coil is wound around the voice coil bobbin 23 and is connected to a signal transmission circuit, and the voice coil bobbin 23 vibrates upon receipt of a signal from the signal transmission circuitry. A device, such as a low-pass filter or a band-pass filter, which limits the frequency band for driving the voice coil bobbin 23 is incorporated into the signal transmission circuit.

Next, the Helmholtz resonator will be described. The Helmholtz resonator is expressed by Equation 1 below where, as a structure of the Helmholtz resonator, L is the duct length $S_p$ is the cross-sectional area of the duct, V is the volumetric capacity (back cavity capacity) within the chamber, c is the speed of sound, and $f_p$ is the port resonance frequency.

$$f_p = \frac{c}{2\pi}\sqrt{\frac{S_p}{VL}} \quad \text{[Mathematical 1]}$$

In the speaker device 1 according to this embodiment, the port resonance frequency is about 480 Hz according to Equation 1, where the back cavity capacity (the total volumetric capacity of the spaces 51, 52, and 53 in FIG. 2), which is defined by the diaphragm 21 and the case 11 is 0.8 liters, the cross-sectional area of the opening of the duct 12 is 6154 $mm^2$, the duct length is 100 mm, and the speed of sound is 343.2 m/s at a temperature of 20° C. The frequency band to be reproduced can be equal to or lower than 100 Hz that is the port resonance frequency using a low-pass filter, for example. Accordingly, the sound waves can be efficiently emitted within a bass frequency range. The volumetric capacity of the chamber, which corresponds to the back cavity capacity, ranges from 0.6 liters to 3 liters in one preferred embodiment.

FIG. 3 is a cross-sectional view where the speaker device 1 according to the first embodiment of the present disclosures is mounted on a vehicle. The speaker device 1 is placed in the opening of a baffle plate 31. Specifically, the frame 29 is fixed to the baffle plate 31 by screwing, bonding, or other means. The baffle plate 31 is attached to a dashboard inside the vehicle, and forms a sealed space 33 together with the enclosure 32 and the speaker device 1. The enclosure 32 is interposed between the dashboard and a bulkhead (not shown) that is a partition from an engine mount. The duct 12 of the speaker device 1 is located in a space inside the vehicle cabin in which a vehicle occupant is seated. Once the speaker device 1 is driven, the duct 12 emits sound waves into the space inside the vehicle cabin.

Figure 4:
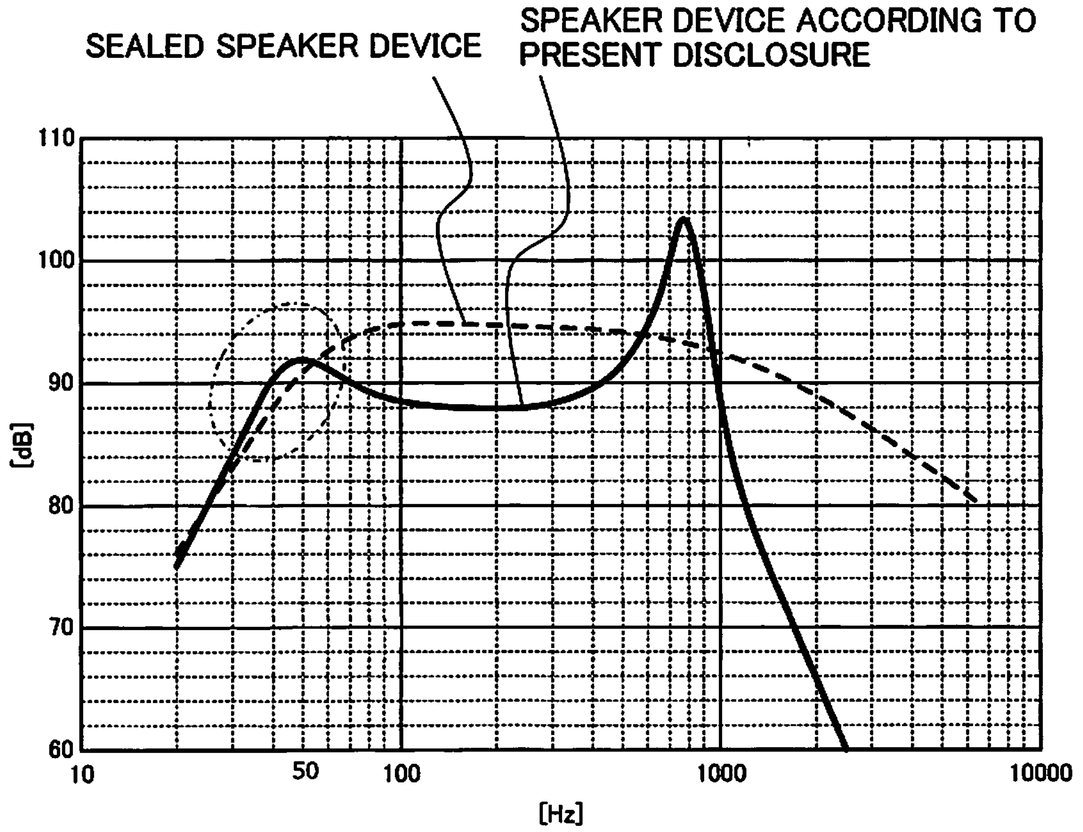
FIG. 4 is a comparison graph showing the frequency characteristics of the speaker device according to the first embodiment of the present disclosure, and a typical speaker device.

FIG. 4 is a comparison graph showing the frequency characteristics of the speaker device 1 according to the first embodiment of the present disclosure, and a typical sealed speaker device. The speaker device according to the first embodiment is placed as shown in FIG. 3. The sealed space 33 has a volumetric capacity of 60 liters. The typical sealed speaker device and the speaker device 1 according to the present disclosure use a speaker unit with the same diameter of 16 cm. The typical sealed speaker device includes a speaker unit attached to a sealed speaker box with a volumetric capacity of 60 liters. In FIG. 4, the horizontal axis represents the frequency (unit: Hz), and the vertical axis represents the sound pressure level (unit: dB) of the speaker measured under predetermined conditions. In FIG. 4, the solid line indicates the characteristics of the speaker device 1, while the broken line indicates the characteristics of the speaker device 1, while the broken line indicates the characteristics of the typical sealed speaker device.

As indicated by the part surrounded by a one-dotted line in FIG. 4, the speaker device 1 has a maximal value of the sound pressure level around 50 Hz. The speaker device 1 has a sound pressure level around 50 Hz which is higher that that of the sealed speaker device. That is, the speaker device 1 has a lower minimum resonance frequency $f_0$ that the sealed speaker device, which improves the bass preproduction performance. The speaker device 1 has a lower back cavity capacity. The mass of air inside the back cavity thus acts as an air load mass on the diaphragm 21. This increases the moving mass Mms of the diaphragm 21 and decreases the minimum resonance frequency $f_0$.

Figure 5:
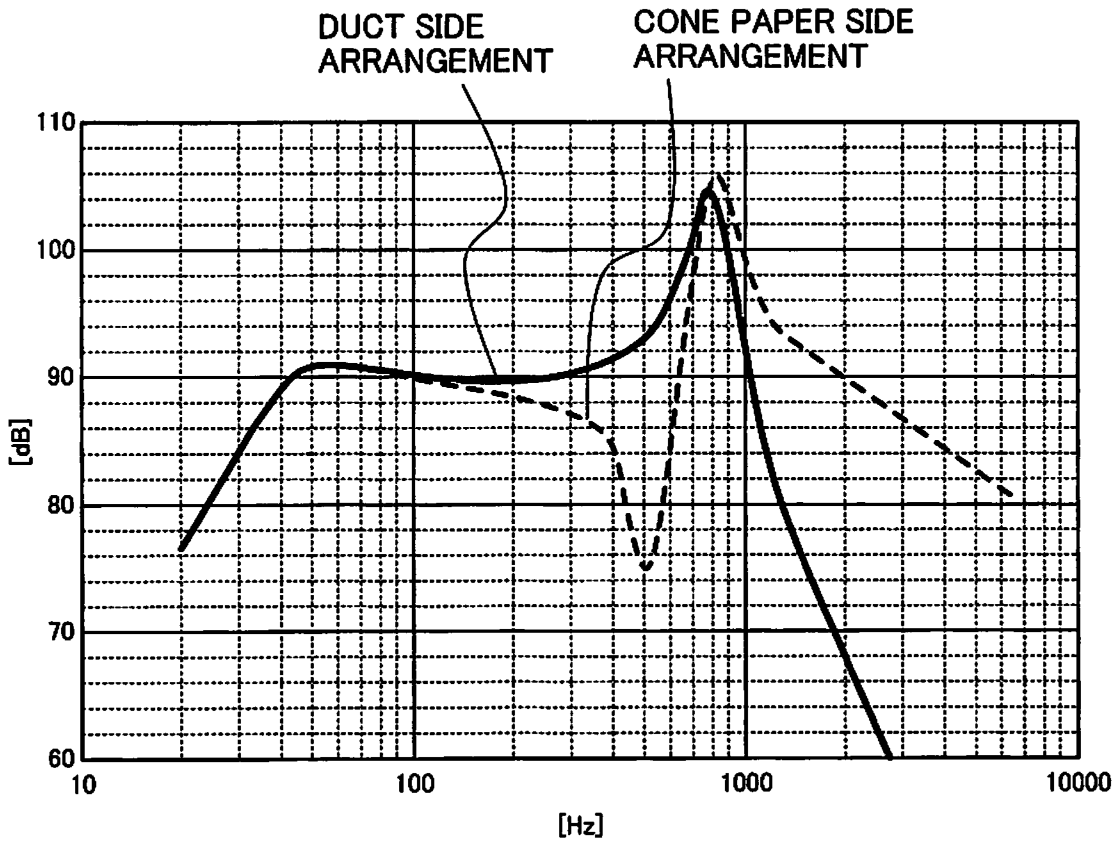
FIG. 5 is a comparison graph showing the frequency characteristics of the speaker device according to the first embodiment of the present disclosure in "cone paper side arrangement" and in "duct side arrangement".

FIG. 5 is a comparison graph showing the frequency characteristics of sound waves emitted to a cone paper (i.e., the front of the speaker unit 20) and to a duct of the speaker device 1 according to the first embodiment of the present disclosure. In FIG. 5, the horizontal axis represents the frequency (unit: Hz), and the vertical axis represents the sound pressure level (unit: dB) of the speaker measured under predetermined conditions. In FIG. 5, the solid line indicates the sound waves emitted to the duct (i.e., the back of the speaker unit 20), whereas the broken line indicates the sound waves emitted to the cone paper. The expression "to the cone paper" means "to the surface of the speaker unit 20 opposite to the side with the Helmholtz resonator".

As shown in FIG. 5, the sound waves emitted to the duct and to the cone paper exhibit substantially the same frequency characteristics within the frequency range lower than 100 Hz. That is, within the frequency range where the speaker device is used as a woofer, the same bass reproduction performance is obtained where the duct is oriented to the space in the vehicle cabin and where the cone paper is oriented to the space in the vehicle cabin.

Figure 6:
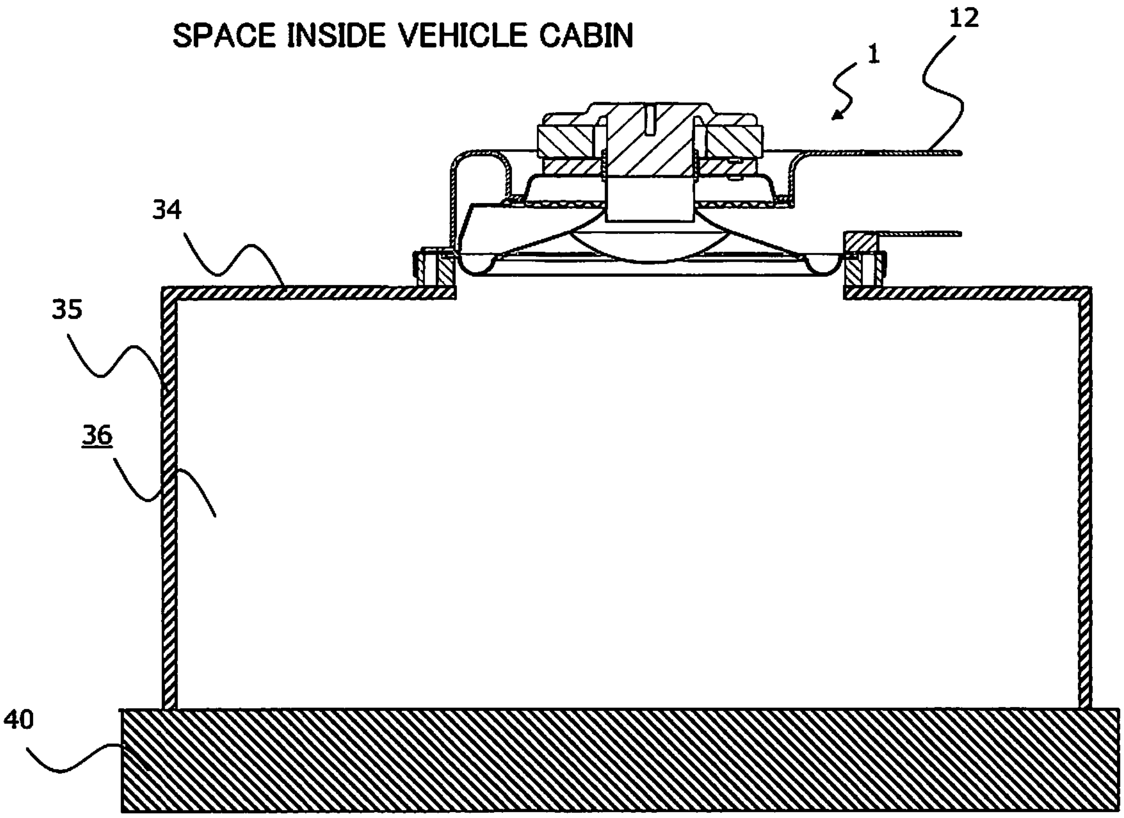
FIG. 6 is a cross-sectional view where a speaker device according to a variation of the first embodiment of the present disclosure is mounted inside a vehicle cabin with the duct facing upward.

FIG. 6 is a cross-sectional view where a speaker device 1 according to a variation of the first embodiment of the present disclosure is mounted inside an automobile with the duct 12 facing upward. Specifically, the figure shows the state where the speaker device 1 is attached with the surface with the cone paper (i.e., the side opposite to the duct 12) oriented to the sealed container. The sealed container has a sealed space 36 defined by the baffle plate 34, the enclosure 35, and a flooring 40 of the automobile. The flooring 40 is a structure constituting the automobile. Accordingly, the duct 12 communicates with the space inside the vehicle cabin of the automobile. In FIG. 6, the sealed space 36 has a volumetric capacity of about 60 liters.

Figure 7:
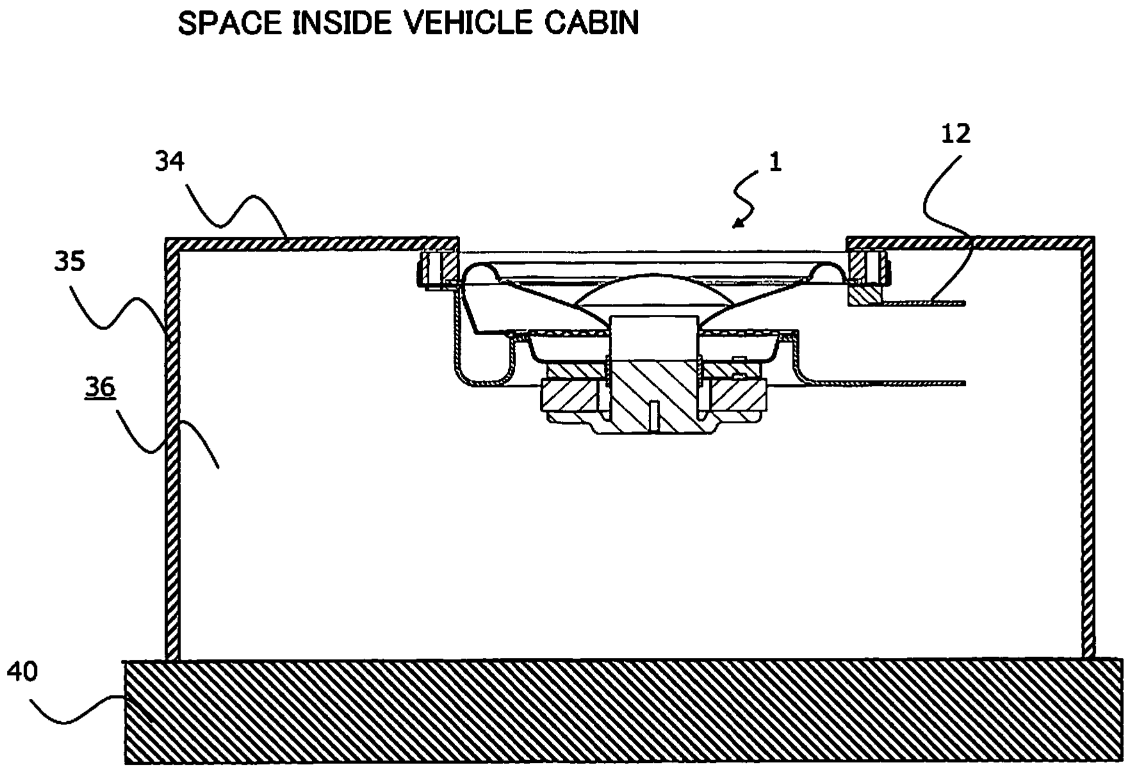
FIG. 7 is a cross-sectional view where a speaker device according to a comparison example of the variation of the first embodiment of the present disclosure is mounted inside a vehicle cabin with the cone paper facing upward.

FIG. 7 is a cross-sectional view where a speaker device 1 according to a comparison example of the variation of the first embodiment of the present disclosure is mounted inside an automobile with the cone paper facing upward. Specifically, the figure shows that the speaker device 1 is attached with the surface with the duct 12 oriented to the sealed container. The sealed container has the sealed space 36 defined by the fable plate 34, the enclosure 35, and a flooring of the automobile. Accordingly, the cone paper communicates with the space inside the vehicle cabin of the automobile. In FIG. 7, the sealed space 36 has a volumetric capacity of about 60 liters.

Figure 8:
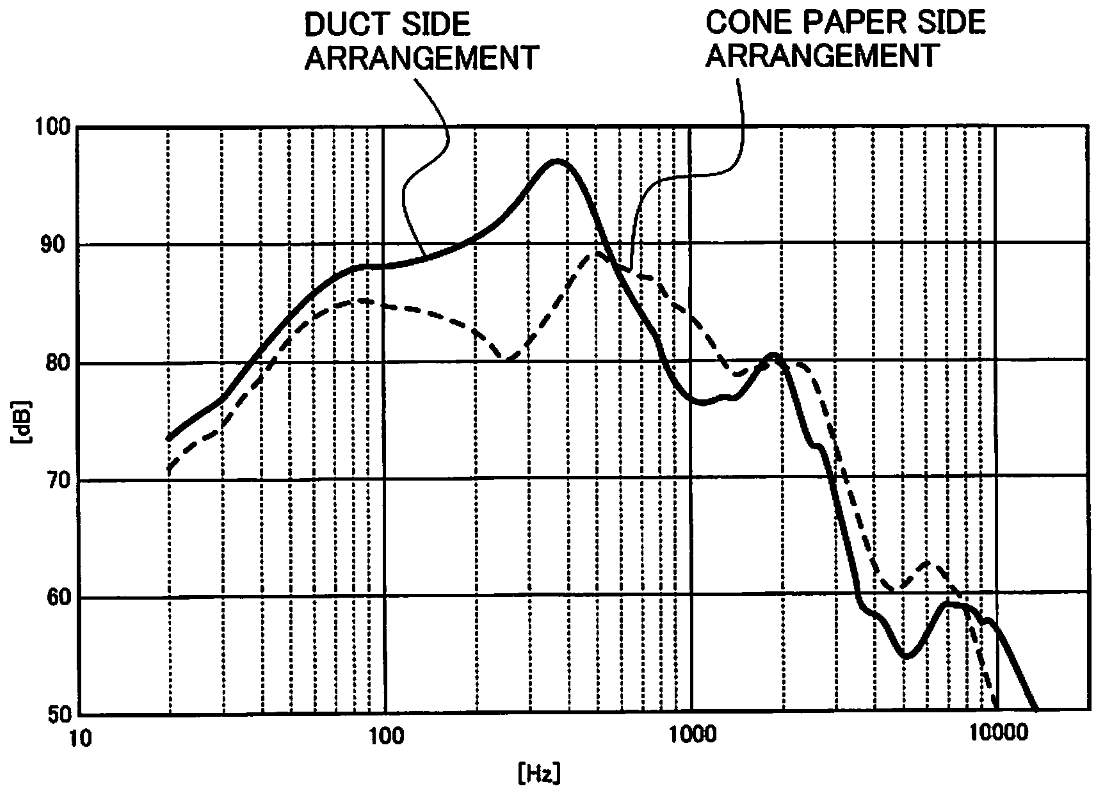
FIG. 8 is a comparison graph showing the frequency characteristics of the speaker devices in FIGS. 6 and 7 placed differently.

FIG. 8 is a comparison graph showing the frequency characteristics of the sound waves emitted from the speaker device 1 shown in FIGS. 6 and 7 into the space inside the vehicle cabin. The speaker device 1 is mounted inside the automobile with the duct 12 facing upward in FIG. 6 (hereinafter referred to as "duct side arrangement", and with the cone paper facing upward in FIG. 7 (hereinafter referred to as "cone paper side arrangement"). In FIG. 8, the horizontal axis represents the frequency (unit: Hz), and the vertical axis represents the sound pressure level (unit: dB) of the speaker measured in the space inside the vehicle cabin under predetermined conditions. In FIG. 8, the solid line indicates the frequency characteristics where the speaker device 1 is mounted inside the automobile with the duct 12 facing upward as shown in FIG. 6. The broken line indicates the frequency characteristics where the speaker device 1 is mounted inside the automobile with the cone paper facing upward as shown in FIG. 7.

As shown in FIG. 8, within the frequency range lower than or equal to 500 Hz, the frequency characteristics in the duct 12 side arrangement maintain a higher sound pressure level than in the cone paper side arrangement. In particular, the duct side arrangement exhibits a higher sound level than the cone paper side arrangement by about 3 dB within the range lower than or equal to 100 Hz where the speaker device is use as a woofer. That is, it is clear from the result shown in FIG. 8 that the bass reproduction performance is improved by orienting the duct 12, which forms the Helmholtz resonator, to the space inside the vehicle cabin, and the cone paper to the sealed space 36.

In this manner, the sealed container providing the sealed space is located on the first surface of the diaphragm 21, and the Helmholtz resonator is located on the second surface of the diaphragm 21 which is the back surface of the first surface. This configuration allows the speaker device 1 to have a lower minimum resonance frequency $f_0$ and to reproduce lower bass (i.e., at a lower frequency) even using a speaker unit with a small aperture. As a result, the speaker device 1 reproduces even bass while being in a small size.

In addition, the first surface of the diaphragm 21 is oriented to the sealed container so that the sound waves emitted from the first surface of the diaphragm 21 and the sound waves emitted from the second surface neither interfere nor cancel out each other. This configuration provides stable bass reproduction performance. As a comparative example, a configuration with a communicator, on the first surface, communicating with the outside of the vehicle will be described below. When an occupant opens a window of an automobile, while hearing the sound (sound waves) emitted from the second surface of the diaphragm 21 in the space within the vehicle cabin, the sound waves emitted from the first surface of the diaphragm 21 enter the space within the vehicle cabin through the open window from the outside of the vehicle to interfere with and cancel out the sound waves emitted from the second surface of the diaphragm 21. This may decrease the bass reproduction performance. In the configuration of the speaker device 1 according to the present disclosure, however, the first surface does not communicate with the outside of the vehicle, which causes less interference and stabilizes the bass reproduction performance. In addition, the first surface does not communicate with the outside of the vehicle, which emits less unnecessary sound (sound waves) to the outside of the vehicle, that is, cause less sound leakage. The configuration reduces the entry of rainwater, sand, dust, and insects through the communicator.

While the first embodiment of the present disclosure has been described above, the present disclosure is not limited to this embodiment.

The following configuration has been described above in the first embodiment. The magnetic circuit 22 is connected to the second surface (i.e., the back surface) of the diaphragm 21. The sealed container providing the sealed space is located on the first surface (i.e., the front surface) of the diaphragm 21. The Helmholtz resonator is located on the second surface (i.e., the back surface) of the diaphragm 21 which is the back surface of the first surface. That is, the Helmholtz resonator is oriented to the magnetic circuit 22 (i.e., the back surface). Alternatively, the present disclosure may have the following configuration. The magnetic circuit 22 may be connected to the first surface (i.e., the back surface) of the diaphragm 21, that is, the sealed container may be oriented to the magnetic circuit 22.

Second Embodiment

Figure 9:
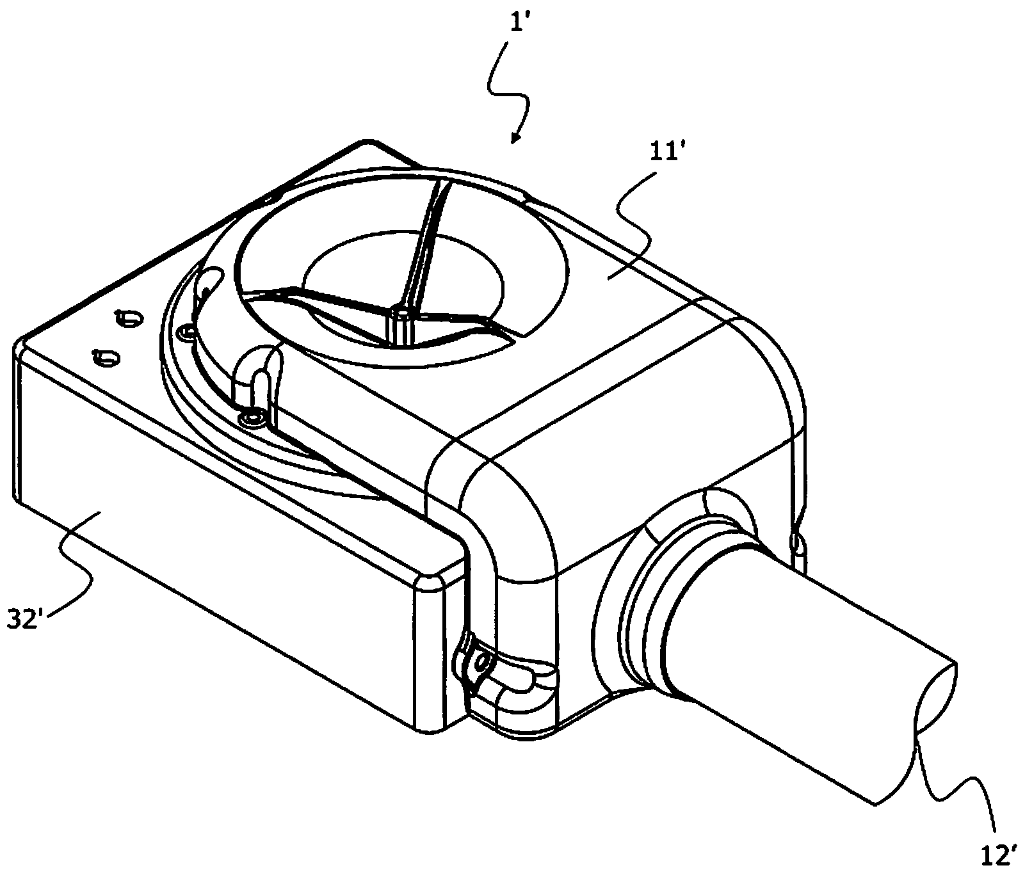
FIG. 9 is a perspective view of a speaker device according to a second embodiment of the present disclosure.
Figure 10:
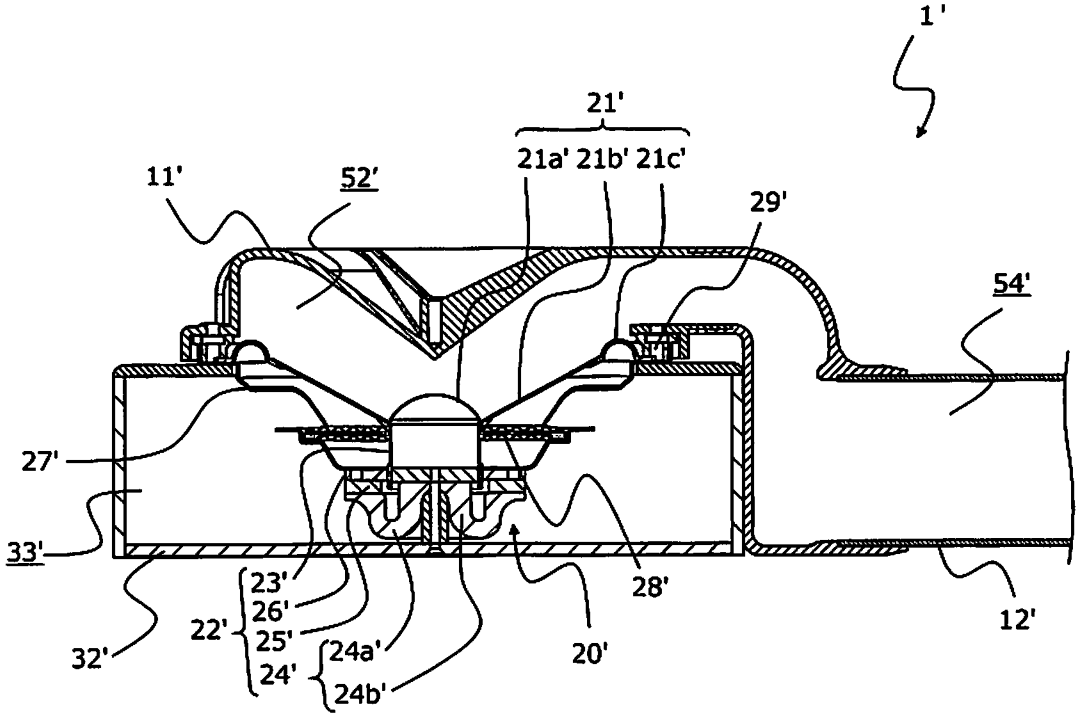
FIG. 10 is a cross-sectional view of the speaker device according to the second embodiment of the present disclosure.

In a second embodiment, a speaker device 1' will be describes which integrally includes a Helmholtz resonator and a sealed container with a diaphragm 21' interposed therebetween. A dash (') is added to the reference characters of the components used in common with the first embodiment FIG. 9 is a perspective view of a speaker device 1' according to the second embodiment of the present disclosure. FIG. 10 is a cross-sectional view of the speaker device 1' taken along the center of a duct 12' and the cap 21*a'* in FIG. 9. A configuration of the speaker device 1' will now be described with reference to these figures.

As shown in FIGS. 9 and 10, the speaker device 1' includes a speaker unit 20', an enclosure 32', and a case 11' joined together. The case 11' includes a duct 12' partially having an opening. The enclosure 32' is joined to the speaker unit 20' to form a sealed space. The case 11' is joined to the speaker unit to form a space 52'. The space 52' communicates with the outside via a space 54' defined by the duct 12'. The case 11' forms a Helmholtz resonator, together with the duct 12'.

The speaker unit 20' is the same or similar to the speaker unit 20 according to the first embodiment. A frame 29' of the speaker unit 20' is sandwiched between the enclosure 32' and the case 11' to fix the speaker unit 20'. In FIG. 10, the Helmholtz resonator is located above the diaphragm 21', and the sealed container below the diaphragm 21'. The space 52' defined by the case 11' and the speaker unit 20' (i.e., the diaphragm 21') has a volumetric capacity of 0.8 liters, and communicates with the outside via space 54' defined by the duct 12'. The sealed space 33' in the sealed container has a volumetric capacity of about 3 liters. The volumetric capacity is 2 liters or more in one preferred embodiment in terms of acoustics, and 60 liters or less in view of the overall size of the speaker device 1' to be mounted on an automobile. The speaker unit 20' is driven to emit the sound waves through the duct 12'.

In this manner, the speaker device 1' includes the Helmholtz resonator and the sealed container which are integral with each other with the diaphragm 21' interposed therebetween, independently from the structure constituting the automobile. Such the speaker device 1' also emits the sound waves through the duct 12' and exhibits higher bass reproduction performance.

The following configuration has been described above in the second embodiment. The magnetic circuit 22' is connected to the first surface (i.e., the back surface) of the diaphragm 21'. The sealed container providing the sealed space is located on the first surface (i.e., the back surface) of the diaphragm 21'. The Helmholtz resonator is located on the second surface (i.e., the front surface) of the diaphragm 21' which is the back surface of the first surface. That is, the sealed container is oriented to the magnetic circuit 22' (i.e., the back surface). Alternatively, the present disclosure may have the following configuration. The magnetic circuit 22' may be connected to the seconds surface (i.e., the front surface) of the diaphragm 21, that is, the Helmholtz resonator may be oriented to the magnetic circuit 22'.

The speaker unit 20 according to the embodiments described above is a circular speaker. The speaker shape is not limited thereto and may be, for example, rectangular.

DESCRIPTION OF REFERENCE CHARACTERS

1 Speaker Device
11, 11' Case
12, 12' Duct
20, 20' Speaker Unit
21, 21' Diaphragm
21*a*, 21*a'* Cap
21*b*, 21*b'* Cone
21*c*, 21*c'* Edge
22, 22' Magnetic Circuit
23, 23' Voice Coil Bobbin
24, 24' Yoke
24*a*, 24*a'* Flange
24*b*, 24*b'* Column
25, 25' Magnet
26, 26' Plate
27, 27' Frame
28, 28' Damper
29, 29' Frame
31, 34 Baffle Plate
32, 32', 35 Enclosure
33, 33', 36 Sealed Space
40 Flooring of Automobile

The invention claimed is:

1. A speaker device comprising:
a speaker unit including a magnetic circuit and a diaphragm that is connected to the magnetic circuit and being capable of generating sound waves by electrically driving the magnetic circuit to vibrate the diaphragm; and
a Helmholtz resonator connected to the speaker unit,
wherein the diaphragm includes a first surface oriented to a sealed space and a second surface that is a back surface of the first surface and is oriented to the Helmholtz resonator;
wherein the Helmholtz resonator includes a chamber oriented to the second surface and a duct connected to the chamber and having an opening in addition to a joint with the chamber;
wherein the chamber has a capacity smaller than a capacity of the sealed space; and
wherein the magnetic circuit is connected to the second surface of the diaphragm and is located outside the chamber.

2. The speaker device of claim 1, wherein the Helmholtz resonator has a resonance frequency set higher than an upper limit of an operation band frequency of the speaker unit.

3. The speaker device of claim 1, wherein the sealed space is provided by a sealed container.

4. The speaker device of claim 3, wherein the sealed container includes a structure constituting an automobile.

5. The speaker device of claim 4, wherein a portion of the duct, which is from the joint to the opening, is located in a space inside a cabin of the automobile.

* * * * *